United States Patent [19]

Dellinger et al.

[11] Patent Number: 4,659,041
[45] Date of Patent: Apr. 21, 1987

[54] PARACHUTE LANDING OF UNMANNED AIRCRAFT

[75] Inventors: Juergen Dellinger, Achim-Uesen; Ulrich Kraemer, Syke-Barrien; Rainer Schlieske, Ganderkesee; Heinz Wohlers, Bremen, all of Fed. Rep. of Germany

[73] Assignee: MBB GmbH, Bremen, Fed. Rep. of Germany

[21] Appl. No.: 784,485

[22] Filed: Oct. 4, 1985

[30] Foreign Application Priority Data

Oct. 16, 1984 [DE] Fed. Rep. of Germany ....... 3437824

[51] Int. Cl.⁴ .............................................. B64D 17/80
[52] U.S. Cl. ..................................... 224/139; 244/147
[58] Field of Search ............... 244/142, 139, 147, 113, 244/75 R

[56] References Cited

U.S. PATENT DOCUMENTS

| 1,556,502 | 10/1925 | Doucett | 244/139 |
| 1,934,382 | 11/1933 | Softis | 244/139 |
| 2,032,824 | 3/1936 | Adams | 244/147 |
| 2,478,758 | 8/1949 | Frieder et al. | 244/139 |
| 2,702,679 | 2/1955 | Culver | 244/139 |

FOREIGN PATENT DOCUMENTS 3233735  3/1984  Fed. Rep. of Germany ...... 244/139

Primary Examiner—Galen Barefoot
Attorney, Agent, or Firm—Ralf H. Siegemund

[57] ABSTRACT

In an unmanned craft with a tail end propeller the improvement of a parachute landing system for causing the craft to land while being suspended by a parachute of the system; the fuselage for the craft has a rearwardly, laterally and, thus, asymmetrically arranged opening leading into a storage compartment for a pilot and a principal parachute system; a flap normally closes the opening but being openable and pivotable in outward direction about an axis being at least approximately vertical to the horizontal disposition of the craft and for about 135°; a cable locks and limits the outward pivoting of the flap, acting as a rudder to steer the craft for 180° during parachute deployment.

7 Claims, 2 Drawing Figures

PARACHUTE LANDING OF UNMANNED AIRCRAFT

BACKGROUND OF THE INVENTION

The present invention relates to an unmanned aircraft including a parachute braking and recovery system to be used for and for obtaining a horizontal landing during return and wherein a particular parachute is arranged in the fuselage of the aircraft and is expelled in the beginning of the landing phase so that the craft can drop to ground in a horizontal position and at a speed that permits safe and soft landing.

Remote controlled aircraft are known which operate on an automated and unmanned basis and they are used, for example, for purposes of reconnaissance. These crafts are usually, or at least in some cases, not deemed to be dispensible items, but are required to return to a home base or to any other predetermined or determinable point of return. For this it is known to realize a safe landing of the craft by means of a parachute which is part of the on-board equipment of the craft. In dependence upon a command issued from ground, the parachute is expelled for purposes of deployment as soon as the craft has reached the particular area for landing, and the parachute guides the craft safely to ground. This type of landing of a craft is, however, rather difficult to realize, particularly if the craft is to land in a precisely defined area. In other words, the localization of the landing process is difficult to achieve. Further difficulties may arise if the thrust-producing propeller of the craft is arranged in the tail thereof. In this situation, there simply arises the danger that the parachute, during its deployment, is in some form caught by the propeller.

DESCRIPTION OF THE INVENTION

It is an object of the present invention to improve aircraft of the type mentioned above such that the problems outlined do not arise. In particular, it is an object of the present invention to provide a new and improved arrangement for and in unmanned aircraft using the principle of parachute expulsion and deployment during landing, but permitting a very accurate landing at a predetermined point of destination.

It is another object of the present invention to improve unmanned aircraft of the type in which the propeller providing the requisite thrust and being arranged in the tail section of the craft will not entangle a parachute that is deployed and expelled from the craft during a landing procedure.

In accordance with the preferred embodiment of the present invention, the objects are achieved by providing in the tail portion of the fuselage of the craft a laterally arranged flap being pivotal in outward direction about an axis which is at least approximately at right angles to the axis of the craft and which flap can be locked into the pivoted position to provide a protection and shielding wall between the propeller in the tail section of the craft and the deploying parachute whereby specifically, then, the parachute is stored in the interior of the fuselage of the craft in a forward position from that particular flap. The flap, in particular, should be pivoted to the fuselage at a point which, seen in the direction of flight, constitutes the rear end of the flap. The locking of the flap in the outwardly pivoted position can in a practical and economical fashion be realized through a capturing, seizing or drag cable. Also, the flap angle should be within 90° to 150° in relation to the longitudinal axis of the craft. In addition, it is proposed that between one of the longitudinal edges of the flap and the fuselage there is provided a deployable foil or sheet which, when deployed, establishes a triangle being effective between the folded out flap and the opening in the fuselage being normally closed by the flap. In addition, it may be advisable to provide a kind of cascaded relationship wherein an auxiliary or pilot parachute of relatively small dimensions is provided which is deployed first and which pulls out of the fuselage the principal parachute being used for landing. All these features are deemed to render the inventive device economical but also reliable under consideration of all the various requirements delineated above.

DESCRIPTION OF THE DRAWINGS

The object and features of the invention and further objects, features and advantages thereof will be better understood from the following description taken in connection with the accompanying drawings in which:

Proceeding now to the detailed description of the drawings, FIG. 1 illustrates an aircraft, for example, an unmanned, remote controlled craft, to be used, for example, for reconnaissance purposes and which following its mission is to be returned and landed safely. Herein, then, is shown a fuselage 1 which includes, particularly in the front section thereof, the requisite electronic and/or optical equipment and which can be described generally as the payload of this unmanned craft. During cruising the craft is driven by a propeller 2 which is arranged in the tail section of the craft. The engine and thrust-producing drive for the propeller is included at a suitable location inside the fuselage 1 and is not illustrated in detail because the disposition and location as well as construction of the propulsion drive is not part of the invention. It is important, however, that the tips of the propeller, when rotating, delineate a circle within which no foreign object must appear unless it will endanger the propeller and, therefore, the safe flight of the craft.

Figure 1:
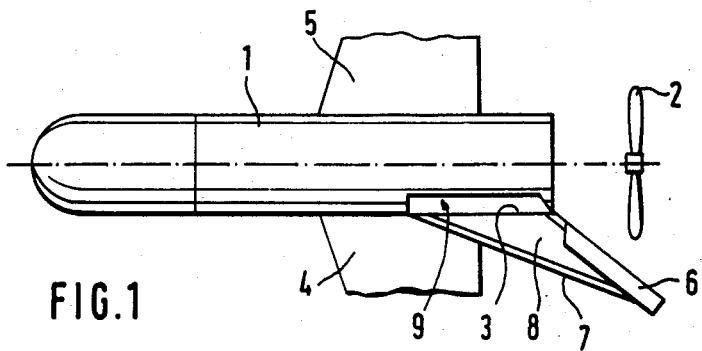
FIG. 1 illustrates a top elevation of a craft improved in accordance with the preferred embodiment of the present invention for practicing the best mode thereof pursuant to which a safe and reliable parachute type landing is to be achieved.

In a portion of the fuselage immediately preceding, i.e., in forward direction as far as the regular motion of the craft is concerned, is provided a lateral, slightly upwardly oriented opening 3. There need be only one such opening so that, in fact, the arrangement to be described next is asymmetric in relation to the longitudinal axis of the craft. This opening 3 extends from a point close to the tail end of the craft up to a point which is near the midpoint of the chord of the wings 4 and 5.

Normally, opening 3 is closed by a flap 6. The flap 6 is hinged with its rear end 6a as seen in a disposition in which it closes the opening 3, and the hinge connection is such that the flap 6 may be pivoted about a vertical or near-vertical axis extending transversely to the plane of the drawing of FIG. 1. The pivot motion, therefore, is one which causes the flap 6 to be pivoted first radially out and then to some extend towards the rear.

A capturing cable or rope 7 connects to the front end 6b of the flap. The cable has its front end connected to the forward end of the opening 3. The lower end, i.e., one of the long sides of the flap 6, is connected to a sheet of flexible foil or the like denoted with reference numeral 8. In addition, this sheet or foil 8 is connected to the fuselage 1 along the lower edge of the flap opening 3. This sheet of foil 8 is therefore of triangular configuration whereby the side of the sheet extending along the capturing cable 7 constitutes the base of an otherwise isosceles triangle. Otherwise, the triangle is dimensioned so that its apex angle is 135°. It was found for practical purposes that the angle should be more than 90° but less than 150°. This angle of course is the same as the pivot angle of flap 6 from the position of closing opening 3 to the folded out position as shown in FIG. 1.

Reference numeral 9 points to the space within the fuselage 1 normally covered by this flap 6 when closing the opening 3. This interior space is the compartment for a parachute landing system which includes a pilot or depolyment assist parachute 10 and the principal parachute 11 connected to the pilot parachute 10.

Figure 2:
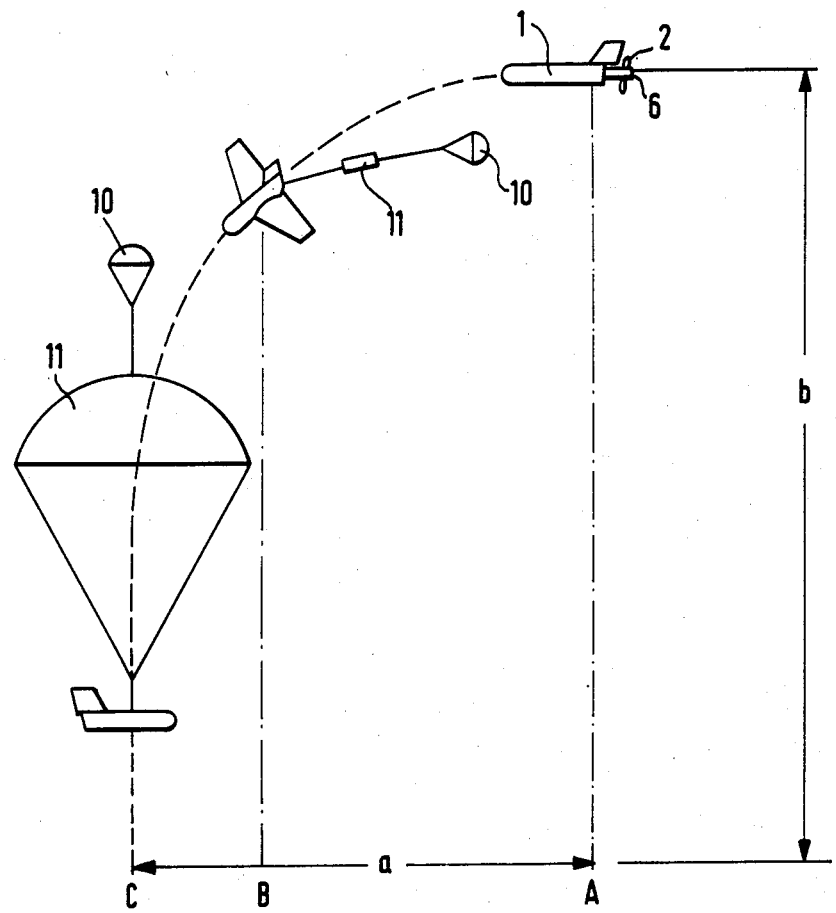
FIG. 2 is a kind of flow chart illustrating schematically various phases of the landing procedure achievable with the craft shown in FIG. 1.

The inventive device functions as follows, as can be seen particularly with reference to FIG. 2. "A" refers to the situation in which the craft is still on regular cruising (from the right of FIG. 2) assuming to fly at an altitude b. During this period of normal operation in which the craft may manoeuvre itself automatically or be controlled remotely, flap 6 closes opening 3 and the parachute system, being comprised of the two parachutes 10 and 11, are appropriately folded and stored in chamber 9. Point A, however, may in addition denote the beginning of the landing phase. That means in the position A the craft has arrived vis-a-vis ground at a point spaced a particular distance from landing destination C and it is found desirable to initiate the landing procedure.

By way of a command issued, for example, from ground, the flap 6 being normally latched to the fuselage is unlatched and by way of a not illustrated spring, for example, is opened a little, the oncoming air, of course, completes the opening procedure by pivoting the flap 6 about an axis near flap end 6a. Owing to the substantial air speed, opening of the flap 6 can be regarded as occurring almost instantaneously, but the cable 7 will limit the degree of opening, depending upon its length, and it is assumed in this specific example that as soon as the flap 6 has an angle of about 135° toward the longitudinal axis of the craft, the flap 6 is regarded as completely deployed and limited in this position by the cable. Clearly, the cable 7 must be strong enough to withstand the force by means of which air tends to pivot the flap 6 further.

It should be realized that in the deployed position flap 6 acts equivalent to a rudder and will, in fact, cause a turning of the craft about a vertical axis. Through additional equipment such as a pilot charge or the like, the pullout and assist parachute 10 is expelled from the now open opening 3, as is shown to occur, for example, after the position A has been passed. Position B in FIG. 2 illustrates a situation in which the pilot and assist parachute 10 has pulled the principal parachute 11 completely out of the compartment 9. Also shown in FIG. 2, position B, is the turning motion of the craft. The flap 6 already provides a certain drag on the craft which is assisted further, even though only to a small extent, by the parachute 10, and the craft 1 will begin to descend.

The turning motion, in effect, establishes a rather favorable relative disposition between the craft and the parachute arrangement because basically the parachute arrangement 10-11, when expelled, will tend to remain essentially in line with the principal forward motion of the craft while on account of the asymmetry the local flight vector of the craft changes, resulting in a turning motion of the craft so that, in effect, the arrangement 10 and 11 is at an angle with the longitudinal axis of the craft as it turns. This then has an effect of keeping the parachutes 10 and 11 laterally away from the tail portion of the craft and here, particularly, from the propeller 2.

In addition, the flap 6, as such, and owing to its upward disposition, so to speak, shields the propeller 2 from the parachute system, which shortly after complete pullout will cause parachute 11 to unfold and deploy. The sheath 8 was also unfolded and deployed during opening of the flap 6, even before pullout of the parachute system and, together with the flap, the now deployed triangular sheet 8 serves in effect as a kind of guide for the pilot parachute 10 as well as for the principal landing parachute 11.

It was found that, owing to the side rubber effect exerted upon the craft by the flap 6 when unfolded, one obtains a shortest possible and reproducible transition from a straight forward cruising flight into a horizontal curved descent. Following the initial yaw motion of the craft, it will in fact transition into a rolling operation and will, in fact, undergo a rather steep descending spiral with a total turn of about 180°. This, then, leads in the shortest possible time into a final descent and landing situation depicted as position C in FIG. 2. At this point the forward motion has ceased to exist, owing to a considerable extent to a complete turnaround of the craft, and the craft itself will in effect be suspended by and from the parachute 11 and with a more or less constant speed of descent the craft will safely sink to ground.

Owing to the very short period of time that elapses between the onset of landing, as per position A, and the attaining of a stabilized final descent position, as per situation and point C, the total longitudinal path which the craft undertakes during this landing phase is very short and rather accurately and reproducibly determinable. Therefore, the point of landing C can be made to have a definite relation (distance a) to the point A at which the landing phase is initiated. This aspect is crucial for an accurate landing of the craft at a particular target point. Since the transition from cruising to landing is well defined and reproducible and owing to the distance a being indeed short, it is quite possible to initiate landing when the craft is at relatively low altitude. In other words, prior to the landing manoeuvre, it is well suitable to cause the craft to lose altitude and to initiate landing from a relatively low altitude so that lateral drifting during descent on account of the crosscurrents in the air or the like can be reduced to a minimum.

The invention is not limited to the embodiment described above, but all changes and modifications thereof not constituting departures from the spirit and scope of the invention are intended to be included in the appended claims.

We claim:

1. In an unmanned craft the improvement of a parachute landing system for causing the craft to land while being suspended by a parachute of the system, the improvement comprising:

a fuselage for the craft with a rearwardly, laterally and, thus, asymmetrically arranged opening leading into a storage compartment for the parachute system, there being a flap normally closing said opening in said fuselage but being openable and pivotable in outward direction about an axis being at least approximately normal to the longitudinal axis of the craft;

means for locking and limiting the outward pivoting of said flap to a lateral position that provides a predetermined yawing force on said fuselage; and said parachute system being contained in the compartment in the interior of the craft behind the opening.

2. Unmanned aircraft as in claim 1 and having a propeller drive in its tail section, said flap being hinged to the fuselage in front of the propeller but in the rear of said opening.

3. Unmanned aircraft as in claim 2 wherein said means for locking includes a cable connected to the other end of the flap undergoing largest displacement upon pivoting of the flap, and to the fuselage.

4. The improvement as in claim 1, said flap when in fully pivoted and deployed position forming an angle in the range from 90° to 150° in relation to a longitudinal axis of the fuselage of the craft.

5. The improvement as in claim 1, and including a foldable sheet horizontally deployed upon pivoting of the flap and being fastened thereto as well as to the fuselage.

6. The improvement as in claim 5, wherein said sheet establishes at least approximately an isosceles triangle.

7. The improvement as in claim 1 wherein said parachute system includes a pilot and deployment assists parachute and a principal parachute, the assist parachute pulling the principal parachute out of said compartment following opening of said flap.

* * * * *